Oct. 22, 1935.  G. GODDU  2,017,856

MANUFACTURE OF SHOES

Filed Nov. 20, 1931  2 Sheets-Sheet 1

INVENTOR
George Goddu
By his Attorney
Harlow M. Davis

Oct. 22, 1935.  G. GODDU  2,017,856
MANUFACTURE OF SHOES
Filed Nov. 20, 1931  2 Sheets-Sheet 2

INVENTOR
George Goddu
By his Attorney,
Harlow M. Davis

Patented Oct. 22, 1935

2,017,856

UNITED STATES PATENT OFFICE 2,017,856

MANUFACTURE OF SHOES

George Goddu, Winchester, Mass., assignor to The Littleway Process Company, Lynn, Mass., a corporation of Massachusetts Application November 20, 1931, Serial No. 576,342

14 Claims. (Cl. 12—145)

This invention relates to the art of shoemaking and is disclosed herein by way of illustration with reference to the manufacture of shoes in which the uppers are secured in overlasted relation to sole members by cement.

In Letters Patent of the United States No. 1,932,545, granted October 31, 1933, I have disclosed and claimed a novel method of making cement lasted shoes in which, as therein exemplified, after an insole and an upper have been assembled upon a last and the upper pulled over, a cement, which preferably is water-dispersed rubber cement, is applied to the marginal portions of the upper materials which are to be lasted over the margin of the insole and to the margin of the insole, and, while the cement is still green or fresh, the upper at each side of the shoe is worked over the bottom of the insole into lasted position with the inner margin of its overlasted portion in upstanding relation to the bottom of the insole. Then, to insure that the upper will be held in lasted position while the cement is setting, metallic fastenings are inserted through the upper and the lip of the insole, the fastenings being clinched against the inner face of the lip. After the cement has set, the upstanding margin of the upper and the lip are trimmed off flush with the surface of the overlasted portion of the upper.

This invention, while retaining all the advantages of the method disclosed in my prior Letters Patent above referred to, aims to provide a still further improved method of making such shoes.

Preferably, and as illustrated, an outer flap split from the insole in the channeling operation is made substantially equal in thickness to the thickness of the upper materials, and by turning the flap inwardly a shoulder is provided at the inner edge of the reduced margin or feather of the insole so that in lasting the upper may be wiped over the feather and against the shoulder with its inner marginal portion against the shoulder and in upstanding relation to the insole. This insures that the upper will be in convenient position for trimming.

Considering now the illustrated method of making shoes over an insole thus prepared, an upper and an insole are assembled upon a last and pulled over. Cement, preferably water-dispersed rubber cement. may then be applied to the opposed surfaces of the free margins of all the upper materials and to the feather of the insole. Since, however, when the shoe is in pulled-over condition, the upper materials in the shank portion of the shoe lie away some distance from the edge of the insole, and it is difficult to estimate how much of the lining will be drawn over the bottom of the insole in the lasting operation, it is preferable under some conditions that no cement be applied to the inner surface of the lining from the ball to the breast line and that a liberal supply of cement be applied to the corresponding portion of the feather of the insole. By this procedure the provision of sufficient cement to cause the lining to be adequately secured to the feather of the insole is insured and the danger of getting cement on that portion of the lining which will be visible in the completed shoe is avoided. After cement has been applied to the upper materials at both sides of the shoe in the manner described, the lasting operation may immediately be performed, the cement being still fresh and green. In the lasting operation the cemented marginal portions of the upper materials are preferably worked over the margin of the insole, the lip raised and metallic fastenings inserted through the upper and the lip. The fastenings employed are preferably staples of fine wire, each staple being driven through the upper and lip close to but slightly above the base of the lip, the ends of the staple being clinched against the inner face of the lip. Preferably the ends of the staple are turned away from each other and each curled back in engagement with the lip. Preferably, too, the staple ends are directed away from the base of the lip in upwardly diverging relation to each other.

In the illustrated method of lasting the toe, the upper materials about the periphery of the toe are first wiped upwardly and inwardly. Then preferably the upper materials are released and the marginal portions of the upper materials, except the outer layer or upper proper, are trimmed off.

Under some conditions this trimming may be done substantially flush with the plane of the feather portion of the insole so that only the outer layer of the upper remains to be wiped in over the feather. Cement, which preferably is pyroxlin cement, is applied to the feather portion of the insole and to the inner face of the margin of the upper proper or outer layer, and then the upper is wiped over the feather of the insole into finally lasted positon. In order to hold the upper in this position while the cement is setting, pressure is applied to the overlasted portion of the upper to force it rearwardly and inwardly about the toe against the shoulder and downwardly against the feather of the insole. Substantially equal pressure is thus applied to all parts of the portion of the upper engaging the feather about the periphery of the toe. This pressure holds the upper in lasted position while the cement is setting and insures a smooth, flat, uniform surface upon the upper materials about the toe.

After the cement used at the sides and toe has set, the pressure on the overlasted margin of the upper at the toe is released and the lip and the portion of the upper connected therewith, including the staples, are removed. This removal requires but a single trimming operation first at one side of the shoe and then at the other. The fact that the lip of the insole is discontinuous at the toe end facilitates the trimming operation because the trimming knife, when trimming the first side of the shoe, may run out through the break in the lip, leaving clear the other side to be trimmed in the same manner. The toe portion can thus be cleanly trimmed off without the necessity of a separate toe trimming operation. The fact that the staples are clinched upwardly away from the base of the lip or trimming line avoids any danger of the trimming knife encountering the staples. In the trimming operation the upstanding portion of the upper and lip at the sides of the shoe are trimmed off inside the staples and flush with the overlasted portion of the upper. Since this overlasted portion of the upper lies on a portion of the insole which has been reduced in thickness an amount equal to the thickness of the upper materials, the trimming is also done flush with the central portion of the insole. By the same trimming operation the upstanding portion of the upper and lip at the toe are trimmed off flush with the surface of the overlasted upper and the central portion of the insole. Thus conditions at the toe as well as at the sides are presented which are well adapted for the reception of an outsole, no filler as such being required. These conditions also favor the upper roughing operation which is performed upon all portions of the overlasted margin of the upper in case the outsole is to be permanently attached by cement alone. The avoidance of wrinkles, beads or lumps on the surface of the overlasted portion of the upper at the toe as well as at the sides greatly facilitates the roughing operation and avoids the liability of roughing through the upper at any portion thereof.

While it is preferable under most conditions to trim the upper and lip in the manner described at the shank portion, it is quite practicable and may be preferable under some conditions to leave the upper and lip untrimmed in the shank portion, the staples of course being left in to assist in holding the upper in lasted position. In this case it is preferable to beat down the upper and lip flat against the shank portion, as illustrated and to provide between the edges of the inturned lips a shank piece which is outwardly convex in transverse section so as to continue the transversely curved contour of the shank portion of the shoe which then presents a satisfactory surface for the reception of an outsole.

These and other aspects of the invention will appear more fully from the following detailed description when read in connection with the accompanying drawings and will be pointed out in the appended claims.

Figure 1:
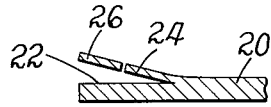
Fig. 1 is a sectional detail view illustrating the channeling operation upon the insole.
Figure 3:
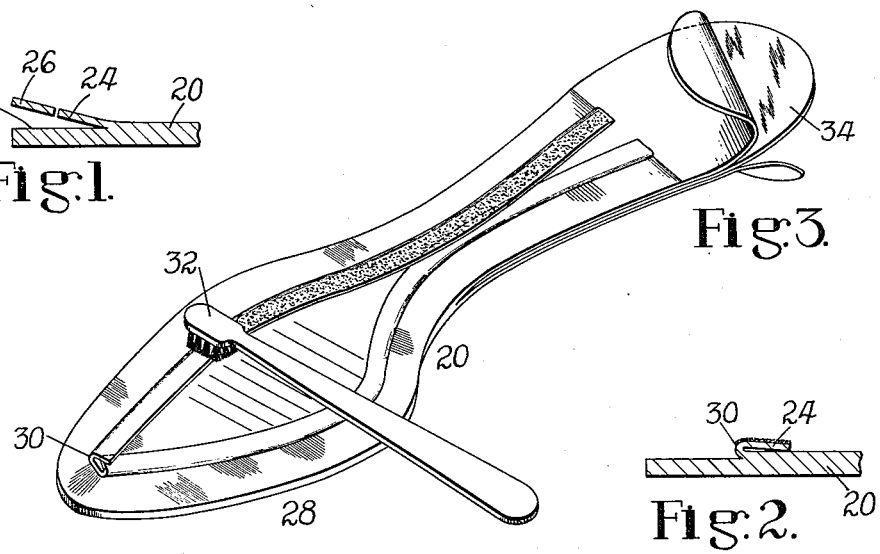
Fig. 3 is a perspective view of the insole showing its outer face and illustrating the application of a stiffening medium to the exposed surface of the lip.
Figure 2:
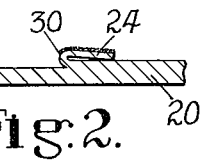
Fig. 2 is a similar view of the insole after the lip is turned.

In the illustrated method of making a shoe in which a cemented upper is lasted over the cemented margin of an insole against a shoulder on the insole and a lip on the insole is raised and secured to the upstanding portions of the overlasted upper by metallic fastenings inserted through the upper and lip, the lip with the attached upper and fastenings being trimmed off flush with the bottom of the insole, the insole may first be prepared with an outside channel, that is, with a channel cut from an outer portion of the insole inwardly. As illustrated in Figs. 1, 2, and 3, an insole 20, preferably of leather, is channeled inwardly from its edge face to form a feather surface 22 parallel to its bottom face for a distance equal to the amount it is desired to have the upper overlap the margin of the insole, for example from three eighths to a half an inch at the forepart. To allow for the thickness of the wings of the counter, the channel may extend inwardly seven sixteenths or more at the portion of the shank adjacent to the breast line. The channel cut is preferably spaced from the outer face of the insole a distance substantially equal to the thickness of the upper materials which are to be used. The outer portion 26 of the outer flap 24 formed by the channeling operation is trimmed off and this may be done simultaneously with the channeling operation. The forepart of the insole may be flexed by forming therein the usual slashes 28. To facilitate turning the outer flap 24 over upon the insole, the toe portion of the flap is snipped off along the line 30 before it is turned and this may be effected by a reciprocating knife extending across the toe of the insole at a distance from its end equal to the width of the feather 22, the action of the knife being so limited that it does not cut into the feather portion but only through the outer flap. That portion of the outer flap 24 at the end of the toe which would interfere with the turning inwardly of the side portions of the flap is thus removed and a space provided between the bases of the two flaps at the toe end. The insole is next tempered by applying moisture to its outer face and is subjected to a lip turning operation by which the outer flap 24 is turned inwardly over upon the body of the insole and pressed flat, as shown in Figs. 1 and 2, the outer flap thus forming a lip or rib 24 (Figs. 2 and 3) to which the lasted upper may be secured. When, after the turning operation, the insole has become sufficiently dry, a stiffening medium is applied to the outer surface of the lip or rib 24, as indicated by stippling in Figs. 2 and 3. Since this surface is parallel to the plane of the bottom of the insole and raised therefrom by an amount equal to the thickness of the lip, the stiffening solution may conveniently be applied to the outer face of the lip without liability of getting the solution on the feather of the insole where it would interfere with the adhesion of the cement or on the interior portion of the insole where it would tend to stiffen the portion of the insole which it is desired to maintain as flexible as possible. The solution may be also applied to the shoulder portion 30 of the insole.

While various materials, such as glue or pyroxylin cement, may be employed as the stiffening medium, I have found most satisfactory for that purpose a solution of shellac, alcohol and acetone substantially in the following proportions:

Denatured alcohol_____ 3½ quarts
Shellac_____ 3 pounds
Acetone_____ 1 pound

This solution may conveniently be applied by hand, a small stiff brush 32 having its bristles cut off square being convenient for the purpose. While, as illustrated, the stiffening solution is applied only to the outer surface of the lip, including if desired the shoulder portion 30, the solution, by reason of its acetone content, tends to penetrate deeply the fibers of the leather, the lip being thus impregnated with the stiffening material. In order to stiffen the shank and heel portion of the insole, it may be split from its rear end to a point adjacent to the ball line about where the insole begins to widen at the forepart and a piece of fiberboard 34 inserted in the split portion where it is preferably secured by cement such, for example, as water-dispersed rubber cement or latex.

After the stiffening solution has become dry, the insole 20 is tacked to a last bottom by tacks 35 which, in case a McKay last is used, will be driven through the usual holes in the metal bottom of the last. The upper is assembled on the last, pulled over, and secured by tacks 36. Preferably the upper, the lining and the wings of the counter are properly adjusted with relation to each other and secured by a tack 38 at each side of the heel-seat located just at the rear of the breast line where the tack will not interfere with the upper trimming operation.

Cement, preferably water-dispersed rubber cement, is applied to various opposed surfaces of the lasting allowance of the upper materials which are to be caused to adhere to each other and to the margin of the insole along the sides from tip line to breast line. The upper materials in the illustrated shoe comprise an upper or outer layer 40 usually of leather, a doubler 42 usually of fabric, for example cotton flannel, a vamp lining 44 usually of fabric, a quarter lining 46 frequently of thin leather, and a counter 48. Since the doubler is usually already cemented to the upper leather 40, cement is applied to the inner face of the doubler from tip line to breast line and, if the upper is loose from or inadequately secured to the doubler, the upper and doubler may be separated and cement applied to the inner face of the upper leather and the outer face of the doubler. Cement is applied to the outer face of the vamp lining 44, to the outer face of the quarter lining 46, and to both the inner and outer surfaces of the flanges of the counter 48 as far as permitted by the tacks 38, and to the inner face of the upper 40 where it will lap over the flange of the counter 48. Cement may also be applied to the inner face of the vamp lining 44 from the pulling-over tacks 36 as far as the ball line. Since at this part of the shoe the vamp lining is held against the edge of the insole, there is no danger of applying cement to the vamp lining beyond the edge of the insole. It is undesirable to apply cement to the lining beyond the line where it will be engaged by the edge of the insole when the upper is brought into lasted position since such cement would be visible in the completed shoe. It is difficult in the shank portion of the shoe, however, to estimate how much of the lasting allowance will extend over the feather of the insole after the upper is brought into lasted position. Hence, under some conditions, it is preferable that no cement be applied to the inner face of the lining from the ball rearwardly at the two sides of the shank. Cement is applied to the feather portion 22 of the insole throughout the ball and shank portion as far as possible toward the tacks 36 and 38, a liberal amount of cement being applied to the portion of the feather extending from the ball rearwardly so that the portion of the vamp lining 44 which has no cement upon its inner face will be sure to adhere to the feather after it is brought with the upper into lasted position. This procedure insures that there will be no cement on the inner side of the vamp lining beyond the line where the upper engages the edge of the insole.

Figure 5:
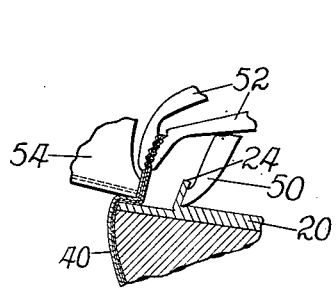
Figs. 5 and 6 are views showing the lasting instrumentalities in side elevation and the shoe in section, which views illustrate steps of the lasting operation performed along the sides of the shoe.
Figure 6:
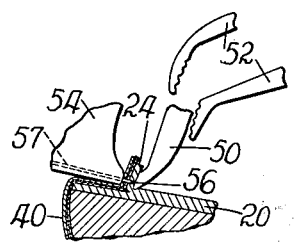
Figure 7:
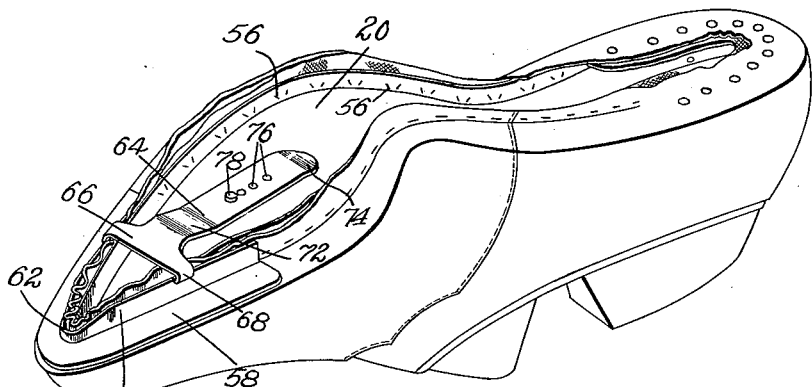
Fig. 7 is a perspective view of the shoe after the toe has been lasted by end-embracing wipers and a binder applied to the toe of the shoe.

After the cement has been thus applied to the upper materials and insole feather at both sides of the shoe, the shoe is ready for the side lasting operation which may conveniently be performed immediately and while the cement is green by a machine of the type disclosed in my prior Letters Patent of the United States No. 1,796,451, granted March 17, 1931. Preferably, before presenting the shoe to the machine, the last is spindled and the upper seized with hand lasting pincers in the shank portion, preferably on the outer side of the shank just back of the ball line, and drawn upwardly and inwardly at this point. Then, while the upper is held in such updrawn position by pressure of the operator's fingers upon the shoe, it is presented to the lasting machine, an anvil 50 of which engages under the laid down lip 24 of the insole and lifts it toward an upright position. A gripper 52 then seizes the upper and draws it upwardly over the insole. A nozzle 54 of the stapling mechanism forces the upper into contact with the feather portion 22 of the insole and crowds it against the shoulder 30 with its inner margin in upstanding relation to the insole (Figs. 5 and 6) and then a staple 56 is driven through the upper and the lip of the insole very close to the base of the lip, the inner ends of the staple being preferably clinched upwardly at diverging angles to the plane of the insole and turned back against the inner face of the lip. This upward and outward clinching of the staple legs with respect to the bar of the staple is effected, as illustrated, by making the angle between the upper side of the line of drive of the staple and the face of the anvil more than ninety degrees. In Figs. 5 and 6 it will be seen that the clinching face of the anvil 50 is at approximately ninety-six degrees to the upper face of the line of drive of the staples, as indicated by the dotted line 57. The inclination of the anvil 50 also insures that its lower end will engage the lip at its base in the sharp angle between it and the insole where its pressure will have less tendency to bend the lip outwardly. The inclination of the anvil also lessens the amount of upward bending of the lip necessary before the staple is driven, at which time the lip is still sharply inclined inwardly where its resistance to outward bending is greater than it would be if it were bent outwardly to a greater extent. This lasting and stapling operation is performed upon successive portions of the upper until one side, usually the outer side, of the shoe has been lasted and then similar operations are performed upon the opposite side, usually the inner side, of the shoe. After this operation the inner portion of the lasting allowance of the upper and the lip of the insole are held in upstanding relation to the bottom of the insole in convenient position for trimming, the resistance of the stiffened lip 24 of the insole being sufficient to hold the upper in lasted position and to prevent the lip from being bent outwardly beyond a position at right angles to the bottom of the insole. Such outward bending might tend to permit slackening of the tension of the lasted upper.

Although the lasting operation described may be continued about the toe portion of the upper, and some manufacturers may prefer so to last the shoe, it is usually preferable to employ end-embracing wipers in this operation such as are provided by the well-known bed lasting machine.

Figure 8:
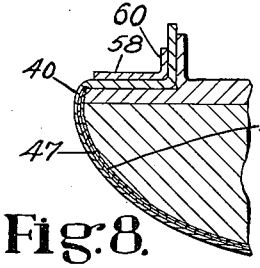
Fig. 8 is an enlarged longitudinal sectional detail of Fig. 7.

The side-lasted shoe is placed in the bed lasting machine, the pulling-over tacks 36 are removed, and the upper about the toe of the shoe is wiped upwardly and inwardly over the feather 22 of the insole by the end-embracing wipers of the machine. The wipers are then backed off and the operator separates the outer layer 40 of the upper, for example the upper leather, from the remainder of the upper materials at the toe, that is the lining 44 and toe box 47 (Fig. 8), and, with a hand knife, trims out these latter materials at the toe end of the shoe substantially flush with the plane of the feather of the insole, leaving practically only the upper leather 40 to be lasted in over the feather at the toe end. Back of the extreme end of the toe a little more of the lining and box may be left so that they will extend farther over the insole on to the feather. Cement, preferably pyroxylin cement, is then applied, for example, with a brush, to the inner side of the lasting allowance of the outer layer 40 of upper material, usually leather, to such portions of the toe box and lining as may be left, and to the portion of the insole feather 22 extending about the toe portion of the shoe. The end-embracing wipers are again operated to upwipe and overwipe the upper 40, the upper being thus carried in over the feather 22 and against the lip 24 and shoulder 30 of the insole, the cemented surfaces of the upper and feather being thus firmly pressed together. A binder of my invention, which per se is claimed in Letters Patent of the United States No. 2,004,239 granted June 11, 1935, upon an application filed in my name, is then applied to the overlasted upper to hold it in position while the cement is setting.

Figure 4:
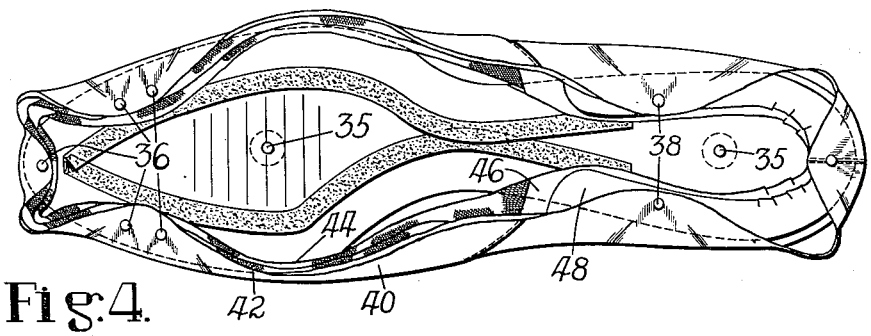
Fig. 4 is a bottom view of a shoe after the upper has been pulled over, the shoe being in condition for the application of cement to the side portions of the free margins of the upper materials.

This binder comprises a horseshoe-shaped flat portion 58 adapted to fit about the toe of the shoe outside the lip 24 of the insole and to engage all portions of the upper which have been lasted over the feather of the insole by the lasting machine wipers. At the inner edge of the portion 58 of the binder is an upstanding flange 60 adapted to press the inner margin of the overlasted portion of the upper against the shoulder 30 and the lip 24 of the insole. At the toe end the height of the flange is reduced at 62 so as not to interfere with the upper portion of the plaits or folds which may form in the marginal portion of the upper at the toe end of the shoe. In applying this binder, the pressure of the wipers upon the upper is released and the binder slipped under the wipers, the wipers being again operated to cause the flange 60 to force the inner marginal portion of the upper against the shoulder 30 and the lip 24 and to cause the portion 58 to press the overlasted upper against the feather of the insole. To hold the binder in this position after the wipers are withdrawn, a T-shaped lever 64 is employed. This lever has a cross-bar portion 66 which engages the top of the flange 60 at opposite sides of the shoe to apply downward pressure equally to the two sides of the binder, and the ends of the cross-bar 66 are turned down at 68 to engage the outer wall of the flange 60 at the two sides. By moving the lever rearwardly, the down-turned ends 68 of the cross-bar 66 are caused to apply inward pressure to the two side portions 60 of the binder and prevent the binder from spreading laterally of the shoe. The stem portion 70 of the binder lever has an offset portion 72 and a down-turned end 74 which engages the bottom of the insole in the vicinity of the ball line. The lever is provided with a series of holes 76 for the reception of an anchoring tack. After locating the lever in the manner described, the operator inserts a tack 78 through one of the holes 76 which is adjacent to the insole tack 35 (Fig. 4) which, in case a McKay last is used, is driven through a hole in the iron bottom of the last, and drives it through the insole into the last sufficiently to cause downward pressure to be applied to the flange 60 at the two sides of the shoe and to hold the portion 58 firmly pressed against the overlasted margin of the upper. This tack 78 goes, of course, through the same hole in the metal bottom of the last as the insole tack 35. The T-shaped lever 64 has a three-point bearing on the work, the down-turned end 74 engaging the insole 20 at one point and the end portions of the cross-bar 66 engaging the flange 60 at two points on opposite sides of the toe, the tack 78 holding the lever down at these points against the work and causing equal pressure to be applied to the two sides of the flange 60. Since the portion 58 of the binder is substantially as wide as the feather and therefore presses all portions of the overlasted upper against the feather of the insole, it holds the upper flat against the feather and prevents the formation of any bulge or bead in the upper outside the portion 58 of the binder.

While the shoe is in the bed machine, the heel-seat may be lasted in the usual manner. The shoe is then removed from the machine and laid aside until the cement used for side lasting as well as that used for toe lasting has had time to set.

Figure 12:
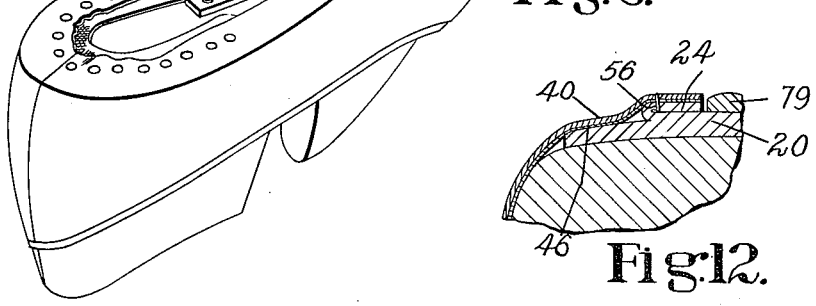
Fig. 12 is an enlarged sectional detail of the shank portion of a shoe prepared for the reception of an outsole without trimming off the upper, lip and staples.

After the cement has set, the tack 78 is withdrawn to release the binder, and the upstanding portions of the upper and lip which extend above the outer surface of the portion of the upper which is lasted on to the feather and above the surface of the inner portion of the feather are trimmed off flush with these surfaces. This operation may be performed, for example, upon a turn shoe upper trimming machine having the general organization disclosed in Letters Patent of the United States No. 429,065, granted May 27, 1890, to Schaadt et al. At the portions that are stapled to the lip, the trimming may be done inside or below the staples so that the staples will be removed with the portion trimmed from the upper and lip. It is within my invention, however, to confine this trimming operation to the forepart of the shoe, leaving the shank portion untrimmed, or trimming only the upper, it being desirable under some conditions to retain the staples in the shank portion of the shoe, in which case the upper and lip will simply be beaten down flat against the surface of the shank, as illustrated in Fig. 12, the lip 24 being thus restored to its initial position against the surface of the insole. The space between the inner edges of the down-turned lips will ordinarily be sufficient to receive a usual steel shank 79 which, if it has the outwardly convex contour in transverse section of shanks frequently employed for this work, will continue the transversely curved contour of the shank portion of the shoe and cause the shoe to present a satisfactory surface for the reception of an outsole. Moreover, the presence of the lip presents no obstruction to the usual operation of roughing the overlasted margin of the upper at the shank portion where such roughing is desired.

Figure 9:
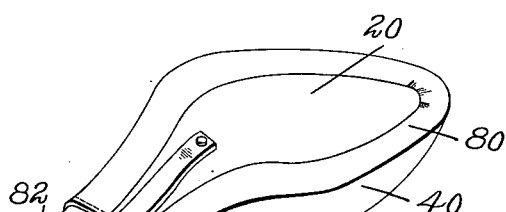
Fig. 9 is a view of a shoe after the upstanding portion of the upper and the lip of the insole with the staples have been trimmed off flush with the overlasted margin of the upper.

In case the upper and lip, including the staples, are trimmed off flush with the surface of the shoe bottom from the breast line forwardly, the shoe will present the appearance shown in Fig. 9 where the surface of the overlasted portion of the upper is flush with the surface of the inner portion of the insole, and an ideal flat condition for the reception of an outsole is presented throughout the shoe bottom. This trimming operation is facilitated by the fact that the lip 24 of the insole is discontinuous at the toe so that in trimming the first side of the shoe the trimming knife may run out through the gap at the toe between the ends of the lip. This renders it easier to remove the pleated tuft of upper material at the toe end without the necessity of any separate toe trimming operation. The trimming of the other side of the shoe, of course, presents no difficulty.

The outer surface of the overlasted margin 80 of the upper 40 may now be roughened to prepare it for the reception of cement. The roughing of shoe uppers which have been lasted by the method described is facilitated because the unusually tight lasting effected in the shank portion tends to emphasize on the outer surface of the upper the line where the upper is bent over the edge of the insole in the shank portion. This line serves as a guide for the operator of the roughing machine and enables him readily to avoid roughing the upper outwardly beyond that line. Cement, preferably pyroxylin cement, is applied to the roughed margin of the upper. A usual steel shank 82 may at this time be attached to the shoe bottom. In place of the usual bottom filler, a piece of fabric or thin felt 84 may be applied to the forepart of the shoe bottom over the exposed area of the insole. This material, however, is not for evening up the shoe bottom, which presents practically ideal conditions in that respect, but merely to prevent direct contact of the leather surfaces of the insole and outsole throughout the area embraced by the inner edge of the overlasted upper so that the shoe will not squeak.

Figure 10:
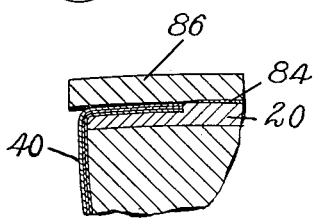
Fig. 10 is an enlarged sectional detail of a shoe in which the overlasted margin of the upper has been roughened and a sole attached thereto by cement alone.
Figure 11:
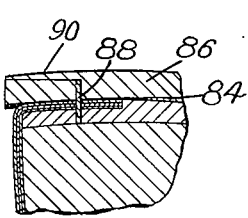
Fig. 11 is an enlarged sectional view of a shoe in which the outsole has been attached to the overlasted margin of the upper and the insole by through-and-through stitches.

An outsole 86 is prepared for attachment to the shoe by the usual reducing and roughing operations, cement, for example pyroxylin cement, being applied to the marginal portion of its attaching face and allowed to dry. Solvent is then applied to the dry cement upon the sole, and the shoe and sole firmly pressed together to cause permanent adhesion of the sole to the shoe, as illustrated in Fig. 10.

Of course, if desired, an outsole 86 may be laid upon the shoe in the usual manner and temporarily held by cement such as rubber cement and then the outsole, upper and insole secured together by through-and-through stitches 88, for example lockstitches, the stitches being preferably concealed in the outsole by the usual channel flap 90. In either case, an extremely flexible shoe is produced and one in which no tack holes appear on the inner face of the insole except those made by the usual insole tacks 35 employed to hold the insole temporarily upon the last and by the single tack 78 used to hold the the binder temporarily in position. In shoes thus made no sock lining is required to cover the insole forward of the heel-seat, so that a considerable saving in sock linings may be effected.

The disclosed insole and method of making it are not claimed herein but constitute the subject-matter of a divisional application Serial No. 720,451, filed April 13, 1934.

Having thus described my invention, what I claim as new and desire to secure by Letters Patent of the United States is:

1. That improvement in methods of making shoes which consists in assembling upon a last an upper and an insole having an inwardly extending lip lying substantially flat against the surface of the insole, applying cement for securing the upper in lasted relation to the insole, working portions of the upper over the insole into lasted position, raising portions of the lip, inserting metallic fastenings through the upper materials and the lip close to the base of the lip, and, after the cement has set, trimming off the lip and the portion of the upper secured thereto flush with that portion of the surface of the upper which overlies the insole.

2. That improvement in methods of making shoes which consists in assembling upon a last an upper and an insole having an inwardly extending lip lying substantially flat against the surface of the insole and having a wide feather and a shoulder, pulling over the upper, applying cement for securing the upper materials to the feather of the insole, lasting portions of the sides of the upper over the feather and against the shoulder of the insole, inserting staples through the upper materials and raised portions of the lip close to the base of the lip, clinching the staples by directing their ends upwardly away from the insole, and, after the cement has set, trimming off the lip and the portion of the upper secured thereto flush with that portion of the upper which overlies the feather.

3. That improvement in methods of making shoes which consists in assembling upon a last a shoe upper and an insole having an inwardly extending lip lying substantially flat against the surface of the insole, applying cement to marginal surfaces of the upper material and to the feather of the insole, working portions of the sides of the upper over the insole into lasted position, inserting fine wire staples through the upper materials and raised portions of the lip close to the base of the lip, turning the ends of the staples away from the shoe bottom in diverging relation to each other and clinching them against the lip, and, after the cement has set, trimming the lip and the portion of the upper secured thereto flush with that portion of the surface of the upper which overlies the insole thus removing the staples.

4. That improvement in methods of making shoes which consists in assembling upon a last an upper and an insole having an inwardly directed lip lying substantially flat against the surface of the insole, pulling over the upper, applying cement to the opposed marginal surfaces of the upper materials and to the feather of the insole, working portions of the sides of the upper over the insole into lasted position, inserting fine wire staples through the upper materials and raised portions of the lip close to the base of the lip, directing the ends of the staples away from each other and away from the insole and clinching them against the inner face of the lip, and, after the cement has set, trimming off the lip and the portion of the upper secured thereto by the staples, the trimming being done inside the staples so that the staples are removed with the lip and the trimmed portion of the upper.

5. That improvement in methods of making shoes which consists in assembling upon a last an insole having an inwardly directed lip lying substantially flat against the surface of the insole and an upper having an inwardly flanged counter between the outer layer and lining, applying cement to both sides of the forward portion of the counter flange, to the inner and outer surfaces of the lining, to the inner side of the outer layer, and to the margin of the insole, working the upper materials including the counter flange into lasted position and securing them in lasted relation to the insole by staples inserted through the upper materials, flange and raised portions of the insole lip, and, after the cement has set, removing the staples by trimming off the materials through which they are driven.

6. That improvement in methods of making shoes which consists in assembling upon a last an upper and an insole having a feather, a shoulder and an inwardly directed lip lying flat against the surface of the insole, pulling over the upper, applying cement to the marginal surfaces of the upper materials to be secured and to the feather of the insole, working successive portions of the sides of the upper over the feather and against the shoulder of the insole into lasted position, progressively raising successive portions of the lip, inserting fine wire staples through the upper materials and the raised portion of the lip close to the base of the lip, and, after the cement has set, trimming off the lip and the portion of the upper secured thereto by the staples, the trimming being done inside the staples so that the staples are removed with the lip and the trimmed portion of the upper.

7. That improvement in methods of making shoes which consists in assembling upon a last an upper and an insole having a wide feather reduced in thickness an amount substantially equal to the thickness of the upper materials, a shoulder at the inner edge of the feather and an inwardly extending lip lying substantially flat against the surface of the insole, applying cement to marginal surfaces of the upper materials and to the feather of the insole, working portions of the sides of the upper over the wide feather and against the shoulder of the insole into lasted position, inserting staples through the upper materials and raised portions of the lip close to the base of the lip, and, after the cement has set, trimming off the lip and the portion of the upper secured thereto by the staples, the trimming being done inside the staples so that the staples are removed with the lip and the trimmed portion of the upper and the surface of the overlasted portion of the upper is flush with the central portion of the outer surface of the insole.

8. That improvement in methods of making shoes which consists in assembling upon a last an upper and an insole having an inwardly directed lip lying substantially flat against the surface of the insole, a wide feather and a shoulder, pulling over the upper, applying cement for securing the upper in lasted position, working successive portions of the sides of the upper over the feather of the insole and against the shoulder into lasted position, inserting staples through the upper materials and raised portions of the lip close to the base of the lip, clinching the staples by directing their ends upwardly and against the lip, and, after the cement has set, trimming off the lip and the portion of the upper secured thereto flush with that portion of the surface of the upper which overlies the feather of the insole.

9. That improvement in methods of making shoes which consists in assembling upon a last an upper and an insole having at the forepart a single inwardly extending lip lying substantially flat against the surface of the insole, pulling over the upper, applying cement to the opposed marginal surfaces of the upper materials and to the margin of the insole, working successive portions of the sides of the upper over the insole and against the lip of the insole into lasted position, inserting fine wire staples through the upper materials and raised portions of the lip close to the base of the lip, and, after the cement has set, trimming off the lip and the upper inside the staples flush with the surface of the overlasted upper.

10. That improvement in methods of making shoes which consists in assembling upon a last an insole having an inwardly directed lip lying substantially flat against the surface of the insole and an upper having an outer layer, a doubler, a vamp lining, a quarter lining, and a counter between the quarter lining and the outer layer, applying cement to the opposed marginal surfaces of the outer layer and doubler, to the opposed marginal surfaces of the doubler and the lining, to the inner marginal surface of the vamp and quarter linings, to the margin of the insole, to both sides of the ends of the counter, and to the surface of the outer layer opposed thereto, working the upper over the margin of the insole into lasted position, and securing the upper temporarily to the lip of the insole while the cement is setting and after the cement has set removing the portions of the upper and lip which are temporarily secured together.

11. That improvement in methods of lasting shoe uppers which consists in applying water-dispersed rubber cement to the marginal portions of an insole upon a last, said insole having an inwardly directed lip lying substantially flat against the bottom of the insole working an upper having no cement upon its inner face over the cemented margin of the insole while the cement is green, thereby causing the insole-engaging surface of the upper to absorb some of the cement upon the insole, securing the lasted upper temporarily in position by inserting separate fastenings through the upper and the lip of the insole, and, after the cement has set, removing the fastenings.

12. That improvement in methods of making shoes which consists in assembling an insole having an inwardly directed lip lying substantially flat against the surface of the insole and a shoe upper upon a last, applying cement to the opposed free marginal surfaces of the upper materials and not to the inner surface of the margin of the lining at the shank, applying cement to the margin of the insole, working successive portions of the cemented upper into lasted position against the lip, inserting staples through the upper materials and raised portions of the lip close to the base of the lip, and, after the cement has set, trimming off the lip and the portion of the upper secured thereto flush with the surface of the overlasted portion of the upper.

13. That improvement in methods of making shoes which consists in assembling an insole having an inwardly directed lip lying substantially flat against the surface of the insole and a shoe upper upon a last, applying cement to the opposed marginal surfaces of the upper materials and not to the inner surface of the margin of the lining at the shank, applying cement to the feather of the insole and more liberally to the shank portion of the feather, working successive portions of the cemented upper into lasted position against the lip, inserting staples through the upper materials and the lip close to the base of the lip, and, after the cement has set, trimming off the lip and the portion of the upper secured thereto flush with the surface of the overlasted portion of the upper.

14. That improvement in methods of making shoes which consists in assembling upon a last an upper and an insole having from toe end to breast line a single lip at each side of the shoe, said lip being directed inwardly and lying substantially flat against the bottom of the insole, applying cement to hold the upper in lasted position at the forepart, working the upper into lasted position over the margin of the insole and against the lip from tip line to breast line, inserting staples to hold the upper temporarily in lasted position at the forepart and permanently at the shank portion, after the cement has set trimming off the lip and the portion of the upper secured thereto, including the staples, at the forepart, beating down the lip and the upper secured thereto at the shank, and attaching a sole to the overlasted portion of the upper.

GEORGE GODDU.